United States Patent
Brogger

(10) Patent No.: US 11,776,178 B2
(45) Date of Patent: *Oct. 3, 2023

(54) DYNAMIC WATERFALL CHARTS

(71) Applicant: Forge Global, Inc., San Carlos, CA (US)

(72) Inventor: Greg Brogger, San Francisco, CA (US)

(73) Assignee: FORGE GLOBAL, INC., San Francisco, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/508,609

(22) Filed: Oct. 22, 2021

(65) Prior Publication Data

US 2022/0122302 A1  Apr. 21, 2022

Related U.S. Application Data

(63) Continuation of application No. 16/859,222, filed on Apr. 27, 2020, now Pat. No. 11,158,099, which is a continuation of application No. 15/804,852, filed on Nov. 6, 2017, now Pat. No. 10,636,180.

(60) Provisional application No. 62/509,396, filed on May 22, 2017.

(51) Int. Cl.
*G06T 11/20* (2006.01)
*G06Q 40/06* (2012.01)
*G06T 11/60* (2006.01)
*G06Q 10/0637* (2023.01)
*G06F 3/04842* (2022.01)

(52) U.S. Cl.
CPC ........ *G06T 11/206* (2013.01); *G06Q 10/0637* (2013.01); *G06Q 40/06* (2013.01); *G06T 11/60* (2013.01); *G06F 3/04842* (2013.01); *G06T 2200/24* (2013.01)

(58) Field of Classification Search
CPC ...... G06T 11/206; G06T 11/20; G06F 3/0481; G06F 17/246; H04L 41/22
USPC .......................................................... 345/440
See application file for complete search history.

(56) References Cited

U.S. PATENT DOCUMENTS

| | | | |
|---|---|---|---|
| 8,719,139 B1 * | 5/2014 | Smyk ..................... | G06Q 40/04 705/36 R |
| 2002/0178105 A1 | 11/2002 | Levine | |
| 2013/0036070 A1 * | 2/2013 | Ng .......................... | G06Q 40/04 705/36 R |
| 2018/0129365 A1 * | 5/2018 | Dayan ................... | G06F 16/248 |

OTHER PUBLICATIONS

International Search Report dated Jul. 19, 2018, issued in International Application No. PCT/US2018/033258.
(Continued)

*Primary Examiner* — Gordon G Liu
(74) *Attorney, Agent, or Firm* — Alberto Araiza; Perkins Coie LLP

(57) ABSTRACT

A graphical chart indicating values for different types of shares of a business enterprise are described. A server can provide data representing price per share and enterprise values for a graphical chart. A selected enterprise value for the business enterprise can be received and values of different types of shares at that selected enterprise value can be determined. Data indicating the values of the different shares can then be provided for display upon the graphical chart.

20 Claims, 8 Drawing Sheets

(56) References Cited

OTHER PUBLICATIONS

Damodaran, A., "Valuing Young, Start-up and Growth Companies: Estimation Issues and Valuation Challenges", Stern School of Business, New York University, [online] [retrieved Feb. 25, 2018]. Retrieved from the Internet <:http://people.stern.nyu.edu/adamodar/pdfiles/papers/younggrowth.pdf>, 67 pages.

Huitson, I., "Highlighting Data Points in Scatter and Line Charts", [online], [retrieved Feb. 25, 2018]. Retrieved from the Internet <: https://chandoo.org/wp/2010/11/11/highlight-daa-points-scater-line-charts/ >, 8 pages.

Lishego, D., "Understanding Waterfall Diagrams", [online], [retrieved Feb. 25, 2018], Retrieved from the Internet: <https://medium.com/startups-and-investment/understanding-waterfall-diagrams-3e4e5866ac69>, 7 pages.

Yu, C., "The Ultimate Guide to Liquidation Preferences", [online], [retrieved Feb. 25, 2018]. Retrieved from the Internet <: https://medium.com/@CharliesYu/the-ultimate-guide-to-liquidation-preferences-478dda9f9332>, 9 pages.

* cited by examiner

305

Funding History

| Date | Amount | Share Class | Post Money Valuation | Key Investors | |
|---|---|---|---|---|---|
| Sep 2010 | $1.58MM | Series Seed | $5.44MM | First Round Capital, Kapor Capital | ◇ |
| Feb 2011 | $14.06MM | Series A | $60MM | Benchmark Capital, Kapor Capital | ◇ |
| Dec 2011 | $43.83MM | Series B | $346.53MM | Benchmark Capital, Menlo Ventures, Bezos Expeditions | ◇ |
| Aug 2013 | $272.79MM | Series C1 | $3.72B | Google Ventures, Benchmark Capital, TPG Ventures | ◇ |
| Aug 2013 | $88.39MM | Series C2 | $3.72B | Google Ventures, Benchmark Capital, TPG Ventures | ◇ |
| Aug 2013 | $3MM | Series C3 | $3.72B | Google Ventures, Ventures, Benchmark Capital, TPG Ventures | ◇ |
| Jun 2014 | $1.35B | Series D | $18.2B | Fidelity Investments, GV, NEA | ◇ |
| Dec 2014 | $2.82B | Series E | $41.2B | Cota Capital, Fidelity Investments, Lone Pine Capital | ◇ |
| May 2015 | $1B | Series F | $51B | Baidu, China CITIC, Bennett Coleman | ◇ |
| Dec 2015 | $6.15B | Series G | $66.6B | Morgan Stanley, Tiger Global, Saudi Arabia's Public Investment Fund | ◇ |

310

Summary Cap Table

| Stock | # of Authorized Shares | Orig. Issue Price | Liquidation Pref. Multiple | % Owned |
|---|---|---|---|---|
| Common A&B | 484,713,423 | $0.00 | --- | 35.5% |
| Series Seed | 174,029,880 | $0.01 | 1.0x | 12.7% |
| Series A | 152,053,436 | $0.09 | 1.0x | 11.1% |
| Series B | 123,645,856 | $0.35 | 1.0x | 9.1% |
| Series C1 | 76,551,280 | $3.56 | 1.0x | 5.6% |
| Series C2 | 31,003,680 | $2.85 | 1.0x | 2.3% |
| Series C3 | 841,864 | $3.56 | 1.0x | 0.1% |
| Series D | 87,193,208 | $15.51 | 1.0x | 6.4% |
| Series E | 84,504,220 | $33.32 | 1.0x | 6.2% |
| Series F | 25,227,947 | $39.64 | 1.0x | 1.8% |
| Series G | 126,096,353 | $48.77 | 1.0x | 9.2% |

*Figure 3*

Customize Valuation

Create your Benchmark Value for this company by selecting from among the valuation inputs listed below. You may also enter your own user submitted value for a specific share class. SharesPost averages the enterprise values implied by each of your selected inputs to create your Benchmark Value and uses it to value your holdings in the company. As your selected valuation inputs change over time, SharesPost updates the Benchmark Value.

615 —

User Submitted [?]

☐ Enterprise Value [_____]

☐ Share Type [Common A&B ▼]  Value [_____]

Last Primary Round [?]

605 —

| | Date | Investors | Size of Round | Share Class | Price per Share (USD) | Implied EV |
|---|---|---|---|---|---|---|
| ☑ | Dec 2015 | Morgan Stanley, Tiger Global, Saudi Arabia's Public Investment Fund, T.Rowe Price and more | $6.15B | Series G | $48.77 | $66.6B |

Publicly Reported Marks [?]

610 —

| | Fund | Date | Source Document | Share Class | Mark | Implied EV |
|---|---|---|---|---|---|---|
| ☐ | Fidelity Blue Chip | Jan 2017 | Document | Series E | $48.77 | $66.61B |
| ☐ | Fidelity OTC | Jan 2017 | Document | Series E | $48.77 | $66.61B |
| ☐ | Fidelity Series Blue Chip Growth | Jan 2017 | Document | Series E | $48.77 | $66.61B |
| ☐ | Fidelity Series Opportunistic Insights | Dec 2016 | Document | Series G | $48.77 | $66.6B |
| ☐ | Morgan Stanley Inst Growth I | Dec 2016 | Document | Series G | $48.77 | $66.6B |
| ☐ | Optimum Large Cap Growth A | Dec 2016 | Document | Series G | $46.33 | $59.95B |
| ☐ | T. Rowe Price Growth Stock Fund | Dec 2016 | Document | Series G | $48.77 | $66.6B |
| ☐ | T. Rowe Price Instl Large Cap Growth | Dec 2016 | Document | Series E | $48.77 | $66.61B |
| ☐ | T. Rowe Price Instl Large Cap Growth | Dec 2016 | Document | Series G | $48.77 | $66.6B |
| ☐ | T. Rowe Price Media & Telecomms | Dec 2016 | Document | Series E | $48.77 | $66.61B |

*Figure 6*

DYNAMIC WATERFALL CHARTS

CLAIM FOR PRIORITY

This application is a continuation of U.S. patent application Ser. No. 16/859,222, entitled "Dynamic Waterfall Charts," filed on Apr. 27, 2020, which is a continuation of U.S. patent application Ser. No. 15/804,852, entitled "Dynamic Waterfall Charts," filed Nov. 6, 2017, now U.S. Patent No. 10,636,180, issued Apr. 28, 2020, which claims priority to U.S. Provisional Patent Application No. 62/509,396, entitled "Dynamic Waterfall Charts," and filed on May 22, 2017. The content of the above-identified applications is incorporated herein by reference in their entirety.

TECHNICAL FIELD

This disclosure relates to data processing, and in particular generating a dynamic chart for calculating and displaying enterprise values.

BACKGROUND

The enterprise value of a business enterprise is based on different classes of stock. The enterprise value of the business enterprise is therefore based on the total amount of stock issued among the different classes issued at various times. For example, successive series rounds of venture capital funding can result in the sale of preferred stock. Thus, a series A round might result in a class of preferred stock sold to investors in exchange for their investment. The subsequent series B round might also result also in preferred stock, but sold at a different price than the series A round. Common stock can also be issued. However, estimating the prices of all of the different types of stock at different enterprise values for the business enterprise can be difficult.

SUMMARY

Some of the subject matter described herein includes a method for generating a waterfall graphical chart indicating values of different types of shares of a business enterprise based on a selected enterprise value of that business enterprise, comprising: generating, by a processor, the waterfall graphical chart having an x-axis indicating a range of enterprise values and a y-axis indicating a price per share, the waterfall graphical chart representing the price per share based on the range of enterprise values for different types of shares of the business enterprise, the different types of shares including one or both of shares issued during a series round of venture capital financing or common shares; determining, by the processor, a position along the x-axis representing the range of enterprise values of an enterprise value indicator that is configured to move along the x-axis to allow a user to select the selected enterprise value; determining, by the processor, the enterprise value corresponding to the x-axis at the position of the enterprise value indicator; determining, by the processor, values of the different types of shares based on the selected enterprise value; and generating, by the processor, a graphical overlay upon the waterfall chart, the graphical overlay indicating the selected enterprise value and the values of the different types of shares based on the selected enterprise value.

Some of the subject matter described herein also includes a method, comprising: providing, by a processor, data associated with a graphical chart representing a price per share based on a range of enterprise values for different types of shares of a business enterprise; determining, by the processor, a selected enterprise value for the business enterprise based on a position of an enterprise value indicator on the graphical chart; determining, by the processor, values of the different types of shares based on the selected enterprise value; and providing, by the processor, data representing the values of the different types of shares for display upon the graphical chart.

In some implementations, the graphical chart includes an x-axis indicating the range of enterprise values and a y-axis indicating the price per share.

In some implementations, determining the selected enterprise value includes: determining, by the processor, a position along the x-axis representing the range of enterprise values of the enterprise value indicator.

In some implementations, the position represents the selected enterprise value.

In some implementations, the different types of shares including one or both of shares issued during a series round of venture capital financing or common shares.

In some implementations, the data representing the values of the different types of shares are for display upon an overlay upon the graphical chart.

In some implementations, the range of enterprise values is based on information associated with recorded venture capital transactions.

Some of the subject matter described herein also includes a computer program product, comprising one or more non-transitory computer-readable media having computer program instructions stored therein, the computer program instructions being configured such that, when executed by one or more computing devices, the computer program instructions cause the one or more computing devices to: provide data associated with a graphical chart representing a price per share based on a range of enterprise values for different types of shares of a business enterprise; determine a selected enterprise value for the business enterprise based on a position of an enterprise value indicator on the graphical chart; determine values of the different types of shares based on the selected enterprise value; and provide data representing the values of the different types of shares for display upon the graphical chart.

In some implementations, the graphical chart includes an x-axis indicating the range of enterprise values and a y-axis indicating the price per share.

In some implementations, determining the selected enterprise value includes: determine a position along the x-axis representing the range of enterprise values of the enterprise value indicator.

In some implementations, the position represents the selected enterprise value.

In some implementations, the different types of shares including one or both of shares issued during a series round of venture capital financing or common shares.

In some implementations, the data representing the values of the different types of shares are for display upon an overlay upon the graphical chart.

In some implementations, the range of enterprise values is based on information associated with recorded venture capital transactions.

Some of the subject matter described herein also includes a system, comprising: a database storing information associated with recorded venture capital transactions; and a processor circuit configured to provide data associated with a graphical chart representing a price per share based on a range of enterprise values for different types of shares of a business enterprise that is a subject of the recorded venture capital transactions, determine a selected enterprise value for the business enterprise based on a position of an enterprise value indicator on the graphical chart, determine values of the different types of shares based on the selected enterprise value, and provide data representing the values of the different types of shares for display upon the graphical chart.

In some implementations, the graphical chart includes an x-axis indicating the range of enterprise values and a y-axis indicating the price per share.

In some implementations, determining the selected enterprise value includes: determine a position along the x-axis representing the range of enterprise values of the enterprise value indicator.

In some implementations, the position represents the selected enterprise value.

In some implementations, the different types of shares including one or both of shares issued during a series round of venture capital financing or common shares.

In some implementations, the data representing the values of the different types of shares are for display upon an overlay upon the graphical chart.

BRIEF DESCRIPTION OF THE DRAWINGS

FIG. 3 illustrates an example of funding histories.
FIG. 6 illustrates an example of a customized valuation estimation.

DETAILED DESCRIPTION

This disclosure describes device and techniques for providing a dynamic waterfall chart. In one example, a dynamic waterfall chart can be generated and displayed to provide a user with a single chart that can indicate the values of the types of shares (e.g., preferred stock issued within different series rounds, common stock, etc.) issued for a business enterprise based on different enterprise values. The values for the shares can be provided via an overlay displayed on the dynamic waterfall chart. Thus, at a given enterprise value, the estimated price of all of the price of all of the types of shares can be determined and quickly provided to the user in an easy-to-understand manner.

Figure 1:
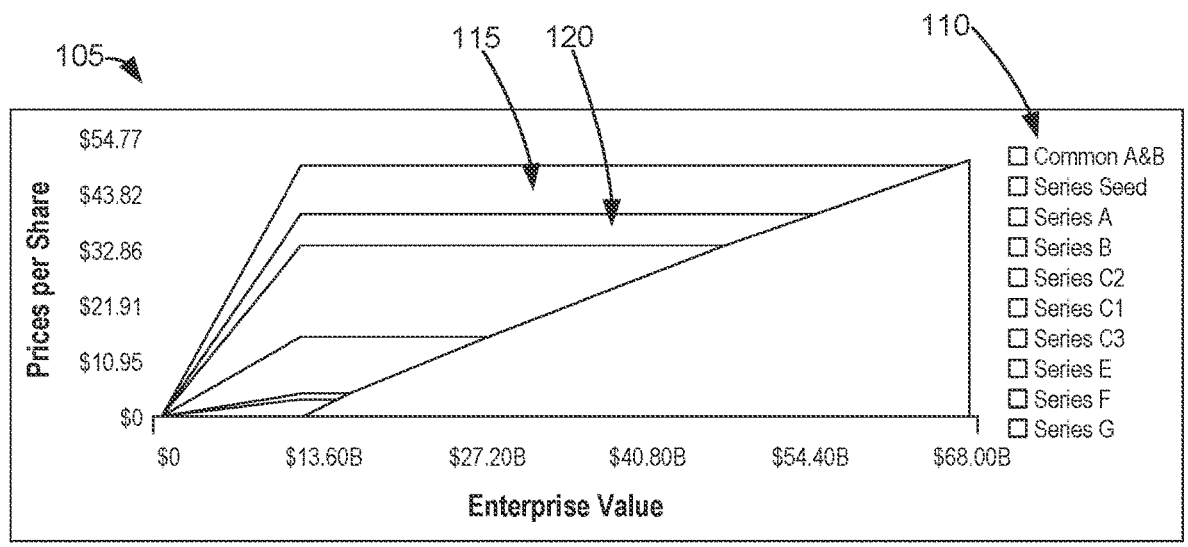
FIG. 1 illustrates an example of a dynamic waterfall chart.

In more detail, FIG. 1 illustrates an example of a dynamic waterfall chart. In FIG. 1, chart 105 is a dynamic waterfall chart for a business enterprise. Chart 105 includes an x-axis indicating an enterprise value for the business enterprise and a y-axis indicating a price per share of the business enterprise for shares 110 indicating that the business enterprise has issued shares in a seed series, series A-G, and common shares. The different shadings representing different portions of chart 105 can indicate an estimated value per share for a type of share for a selected enterprise value. That is, the overall selected enterprise value can be composed of estimated values for the different types of shares. For example, portion 115 can indicate the estimated value for a preferred stock issued in a series G round of venture financing. Portion 120 can indicate the estimated value for a preferred stock issued in a series F round of venture financing. As a result, the values for the different types of shares can be depicted at the same time to provide a user with significant detail regarding the enterprise value of the business enterprise.

Figure 2:
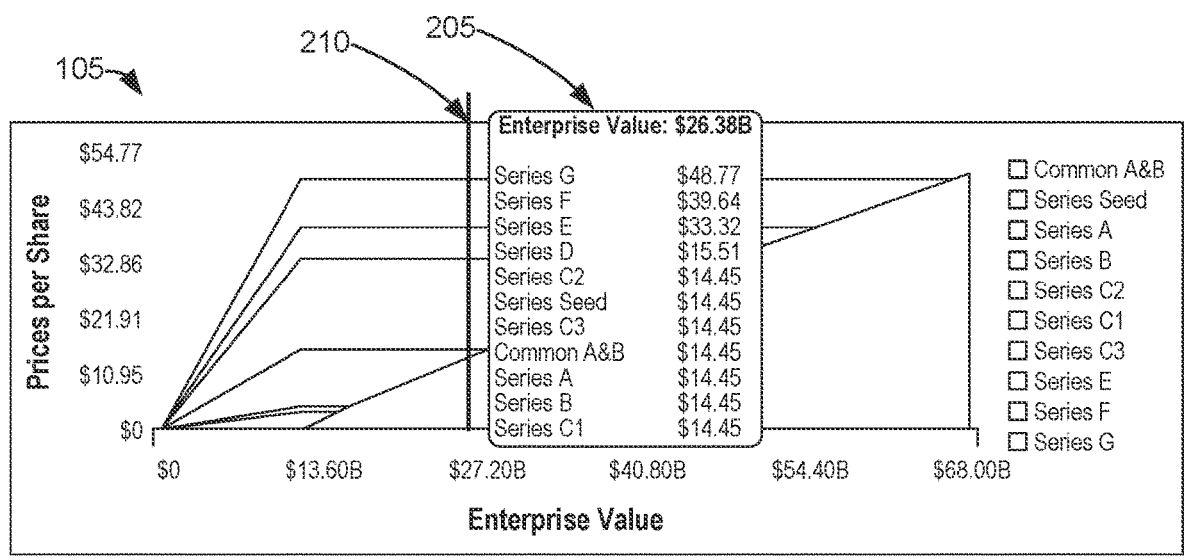
FIG. 2 illustrates an example of providing an overlay indicating pricing information for stock.

FIG. 2 illustrates an example of providing an overlay indicating pricing information for stock. In FIG. 2, overlay 205 can be provided to indicate the various values of the different types of shares for a given enterprise value in more detail. For example, if chart 105 is displayed on a webpage via a web browser on a user's computer (i.e., the chart 105 is generated by a web server), then as the user selects different enterprise values (e.g., by moving a mouse cursor, selecting and moving an indicator 210 displayed on chart 105 via a touchscreen, etc.) then overlay 205 can be generated and displayed. Overlay 205 can provide the values of a single share of each type of share based on the selected enterprise value. For example, in FIG. 2, indicator 210 is placed at an enterprise value of $26.38 billion. Thus, the web server generating chart 105 can determine that the user wants to know an estimate for the different values of the types of shares issued for the business enterprise if it is valued at $26.38 billion. This can be determined and the results can be displayed via overlay 205, providing the user with a breakdown detailing all of the values. For example, in FIG. 2, overlay 205 indicates that the series G shares are valued at $48.77 and that the series F shares are valued at $39.64. Thus, the user can be provided dynamically generated information regarding the values of the different types of shares for different enterprise values. This can provide the user with more insight regarding how much they should pay for those shares in an quick and easy-to-understand manner.

The user can also select to see the value of a single or a smaller group of types of shares. For example, referring back to FIG. 1, the individual types of shares indicated in shares 110 can be selected or de-selected to select to have information regarding certain types of shares to be displayed via chart 105. For example, if the user is only interested in viewing the values of series G and F shares, then these can be selected with the checkboxes next to the corresponding labels of shares 110. This results in chart 105 only displaying information related to series G and F shares.

The values of the shares and other related information of chart 105 (e.g., the types of shares, etc.) can come from the funding history of the business enterprise. FIG. 3 illustrates an example of funding histories. In FIG. 3, funding history 305 can indicate the date, amount, type of share (e.g., seed, series A, series, B, etc.), valuation, and the investors who purchased the shares. Summary cap table 310 can provide, for each type of share, the number of authorized shares, the original issued price, any liquidation multiples, and the percent owned for each type of share. The data from funding history 305 and summary cap table 310 can be used to generate chart 105 in FIGS. 1 and 2 and generate the information for overlay 205. For example, if it is determined that the user wants to know what the value of series G shares are for the business enterprise at an enterprise value of $26.38 billion, then the data from funding history 305 and summary cap table 310 can be analyzed by the server and the value for the series G shares can be determined accordingly. If the user next wants to know the value for the series G shares at a $45 billion enterprise value, then the user can quickly manipulate chart 105 (e.g., by moving indicator 210 and placing it at $45 billion on the x-axis) and overlay 205 can be updated to provide the new information based on a $45 billion enterprise value and the data from funding history 305 and summary cap table 310.

Figure 4:
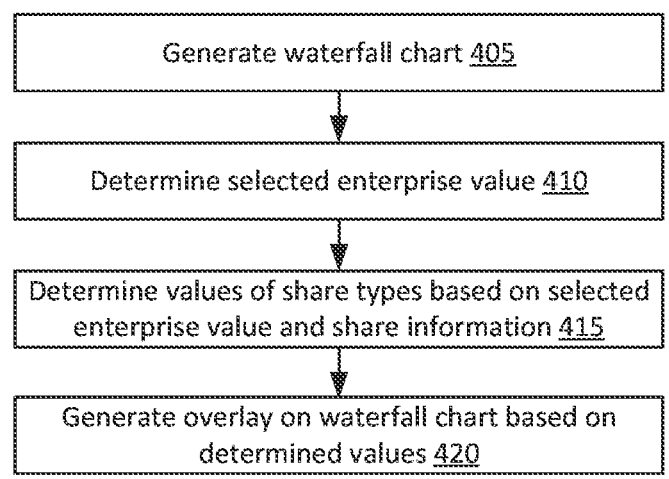
FIG. 4 illustrates an example of a block diagram for providing a dynamic waterfall chart.

FIG. 4 illustrates an example of a block diagram for providing a dynamic waterfall chart. In FIG. 4, a waterfall chart can be generated (405). For example, a user can use a web browser to browse to a website, open up a mobile phone application, etc. to manipulate a waterfall chart. A server can determine this and then generate or provide data for a dynamic waterfall chart such as chart 105, and provide the corresponding data back to the user's computing device for it to be displayed on a display screen of the user's computing device.

The user can manipulate the chart to select an enterprise value and, therefore, the server can determine the selected enterprise value (410). For example, in FIG. 2, the user can move indicator 210 left or right along the x-axis to indicate that he or she wishes to receive some insight regarding the values of the different types of shares based on a given enterprise value as represented by the x-axis. In FIG. 2, the user can place indicator 210 at $26.38 billion along the x-axis to indicate that he or she wishes to see the values of the shares if the business enterprise is valued at $26.38 billion. Thus, the server can determine the placement of the indicator along the x-axis, determine an enterprise value based on that position, and then determine the values of the shares based on that enterprise value, as discussed herein.

The values of the different types of shares based on the selected enterprise value and share information can be determined (415). For example, if indicator 210 in FIG. 2 is at the x-axis position indicating $26.38 billion, then the values for the different types of shares can be determined, for example, by accessing the information regarding the types of shares represented by funding history 305 and summary cap table 310 in FIG. 3. For example, the information depicted in FIG. 3 might have been uploaded onto the server previously (e.g., into a database) and that information can be analyzed to determine the values of the types of shares. The values can be different based on the position of indicator 210, for example, because different positions of indicator 210 represent different enterprise values for the business enterprise being studied. Funding history 305 and summary cap table 310 can also be caused to be displayed on the same or different webpage than chart 105 so that the user can also see the information that it provides, for example, they might want to know the key investors in each of the different rounds of venture financing.

When the values of the share types is determined, an overlay can be caused to be generated by the server such that it is displayed for the user (420). For example, overlay 205 in FIG. 2 can be provided indicating the enterprise value representing the position of indicator 210 upon the x-axis and the values of the different types of shares. In some implementations, the values can be displayed in descending order from highest value to lowest value, or vice versa.

Figure 5:
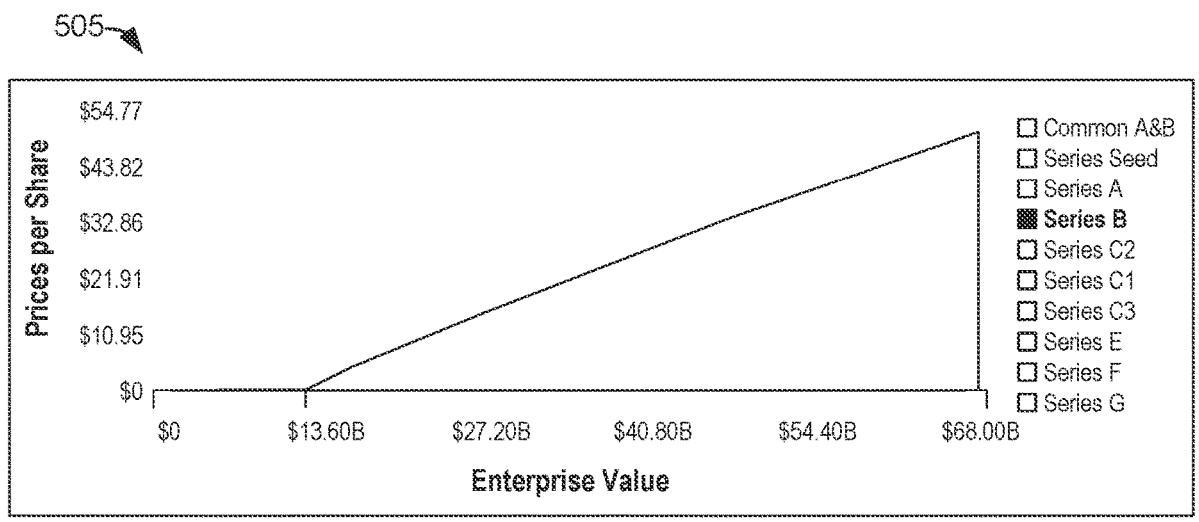
FIG. 5 illustrates an example of providing a pricing for stock at different enterprise values of an initial public offering (IPO).

Many of the prior examples provide values of shares based on a merger & acquisition (M&A) activity at the enterprise value. However, the values based on an initial public offering (IPO) can also be provided. FIG. 5 illustrates an example of providing a pricing for stock at different enterprise values of an initial public offering (IPO). In FIG. 5, chart 505 can be generated and provided to represent the values of shares if an IPO occurs and the preferred shares were converted to common stock (e.g., the preferred shares of a series B round a depicted in FIG. 5 converted to common shares). Thus, for different enterprise values as dictated by the IPO, the values of the different types of shares can also be provided.

In some implementations, a user can toggle between chart 105 and 505 as depicted in FIGS. 1 and 5, respectively. For example, the user can initially see the values of the different types of shares in an M&A outcome, but then select a drop-down box and select an IPO option. The server can then update the chart to be displayed and provide chart 505. The user can then switch back to chart 105 by manipulating the drop-down box.

Sometimes, a user might want to value an asset based on the activity of only some investors. For example, a user might consider one investor providing venture financing to be too aggressive and, therefore, overly value shares. Another investor might be more in line with the user's own thinking regarding a possible enterprise value. FIG. 6 illustrates an example of a customized valuation estimation. In FIG. 6, the various investments into the business enterprise are provided and the user can select the checkboxes to determine and display an enterprise value 615 based on the selected transactions.

For example, the user might want to generate an enterprise value for a business enterprise. However, the user might want a more customized enterprise value than merely considering all of the data available. For example, in FIG. 6, last primary round 605 can indicate the most recent round of financing for the business enterprise. Prior rounds 610 can indicate other publicly reported investments including the fund, date, source document (e.g., a document uploaded to the server indicating the details), type of share (e.g., series E), value, and implied enterprise value based on that round. The user might not consider some of the implied enterprise values to be accurate. Thus, by selecting the checkboxes, and not selecting the checkboxes for the transactions in which the user considers the implied enterprise values to be inaccurate, the user can request that a customized enterprise value 615 be generated based on the check-boxed transactions.

In some implementations, users can input the different holdings that they own. For example, if the user purchased series C shares for company A at $X, and purchased series C shares for company B at $Y, then they can input these onto the website. To provide the customer with an understanding of what their portfolio with these holdings might be worth, the information/data discussed herein can also be used to determine the value of the customer's portfolio. As more rounds or investments are made, then the value of the user's portfolio can updated accordingly. Thus, the system can track investments and update the value of the user's portfolio.

In some implementations, pre-defined non-traded equity sales can be managed. For example, in public markets, rule 10b5-1 plans allow for people with possession with material information to trade shares. In some implementations, a similar system can be set up in the private markets. Thus, a user can set up a plan, for example, on January 1 indicating that on March 30, if the shares can be sold for at least $X but less than $Y then a Z amount of shares should be sold. This information can be provided via a graphical user interface (GUI) to facilitate trades in the private markets.

Additionally, because information regarding various investments is stored, the activity of specific venture capitalists can also be tracked. For example, a user can identify what venture capitalists have invested in, track the values of those investments, and identify top-performing venture capitalists based on the data or information. Thus, a user can identify high-performing venture capitalists based on the enterprise values. The user can then decide to make similar investments.

Figure 8:
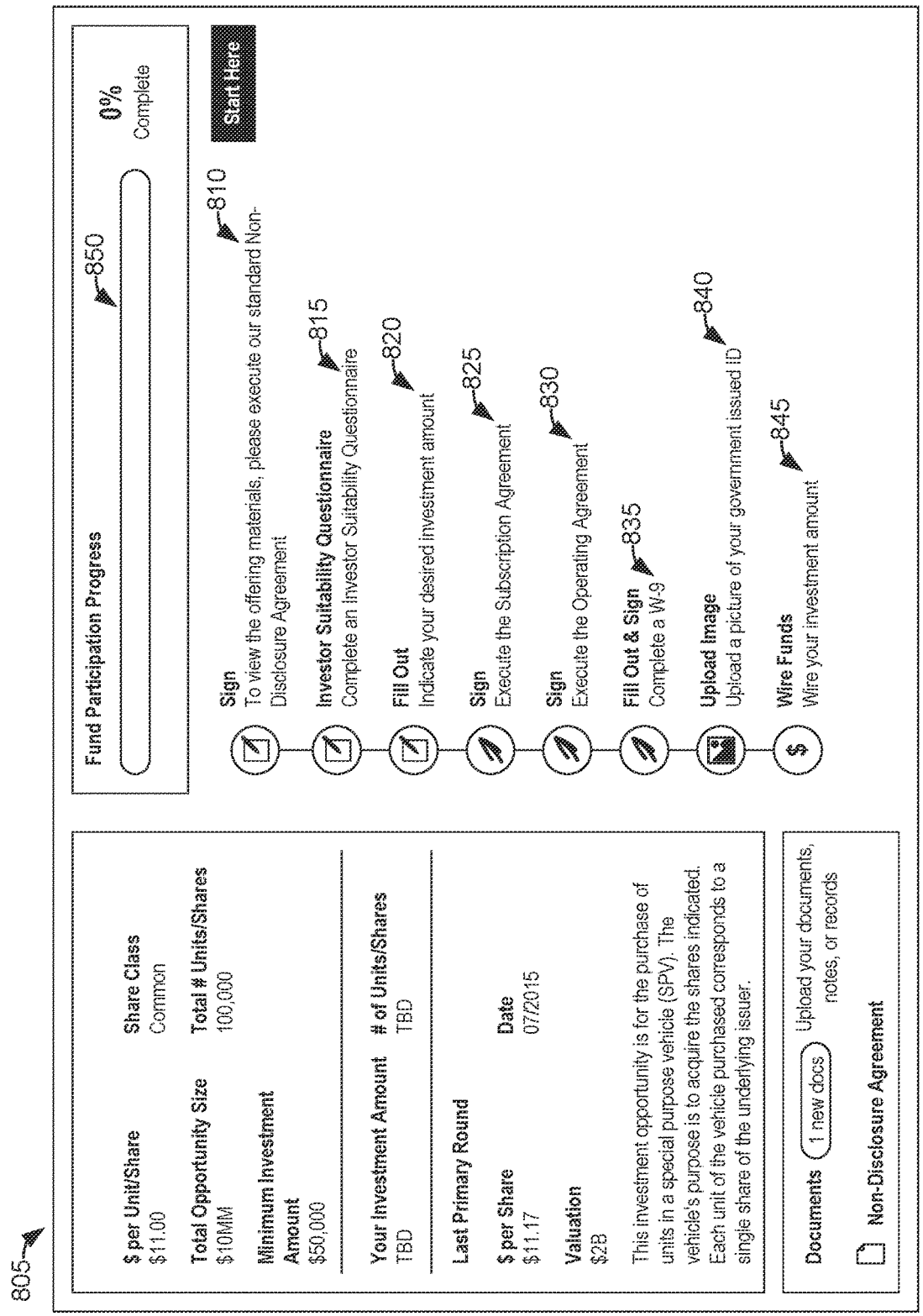
FIG. 8 illustrates an example of an interface for fund investment.
Figure 9:
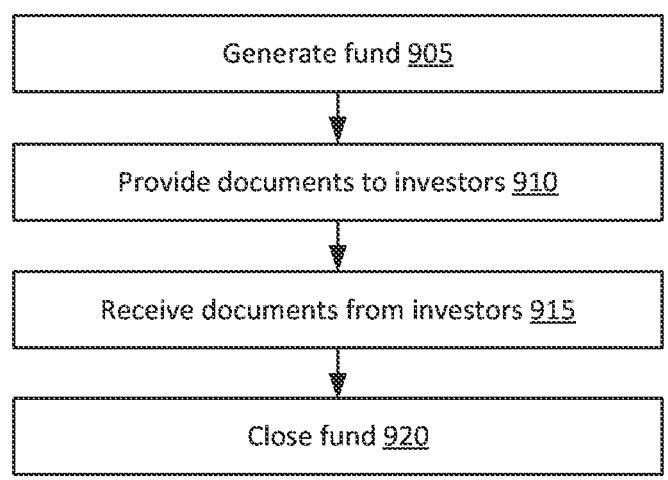
FIG. 9 illustrates an example of a block diagram for automation a fund investment.

A user can also participate in a fund investment. FIG. 8 illustrates an example of an interface for fund investment. FIG. 9 illustrates an example of a block diagram for automation a fund investment. In FIG. 9, at block 905, a fund investment can be generated. For example, in FIG. 8, fund dashboard 805 portrays a process for a user to participate in a fund investment. For example, a funding platform can include fund dashboard 805 to provide funding opportunities in a limited liability corporation (LLC) created for a seller (e.g., a corporation selling equity such as shares of its ownership) as a special purpose "vehicle" (SPV) or mechanism for buyers to purchase. Shares of the LLC can therefore represent an opportunity to invest in for buyers.

For example, in FIG. 8, the fund investment indicates that the LLC is offering 100,000 units or shares at $11 a share of a class type of common shares. The total opportunity size is indicated as $10 million and that the minimum investment amount to participate in the fund investment is $50,000. Additionally, some contextual information regarding previous rounds of funding can be detailed, for example, the last value per share, the date of the last funding, and valuation of the business or issuer that is subject to the fund investment.

At block 910 in FIG. 9, documents can be provided to investors to complete to participate in the funding. For example, portion 810 of fund dashboard 805 indicates that non-disclosure agreement (NDA) should be signed. If a user selects portion 810, the NDA can be provided to be filled out (e.g., signed and dated). This can ensure the confidentiality of the terms (e.g., share price, opportunity size, etc.) of the fund investment. After providing an executed NDA, this can be analyzed and if deemed to have been properly filled out, then the user can be allowed to further proceed to participate in the fund investment by advancing to portion 815. As more of portions 810-845 are completed, fund participation progress bar 850 advances until the completion percentage indicates 100%, which is indicative of the user completing all of the steps (e.g., portions 810-845) to participate in the fund investment.

The other documents that are provided and/or filled out by the user include portion 815 providing an investor suitability questionnaire. The questionnaire can include questions for the user to answer. Based on the answers, the user may be allowed to proceed with participating in the fund investment, or may be disallowed to participate. Portion 820 allows a user to input how much the user desires to invest (e.g., $50,000). Next, at portion 825, the user can be provided a subscription agreement to sign and at portion 830 the user can be provided an operating agreement to review and sign. The user can also be allowed to fill out tax-related forms such as portion 835 providing a request to fill out a W-9 for the Internal Revenue Service (IRS) to provide a name, address, taxpayer identification information (e.g., social security number), etc.

A portion 840, the user can provide (e.g., upload) a picture of a government issued identification such as a driver license, passport, etc. At portion 845, the user can wire their desired investment amount from portion 820. When all of portions 810-845 are completed, fund participation progress bar 850 advances to 100%.

Returning to FIG. 9, at block 915, the platform can receive all of the documents from the investors. When all of the investors are at 100% towards the fund participation progress bar 850, then the fund can be closed at block 920. In some implementations, when the total opportunity size is reached (e.g., $10 million in FIG. 8) then the fund can be closed despite some users not advancing to 100% of the fund participation progress bar 850. Thus, some users might not have provided the proper documentation to be allowed to participate in the investment and, therefore, they can be excluded.

Representatives of the LLC can also counter-sign the documents of portions 810-845. Once the investment fund is closed, the investors own the appropriate shares of the investment opportunity.

Figure 7:
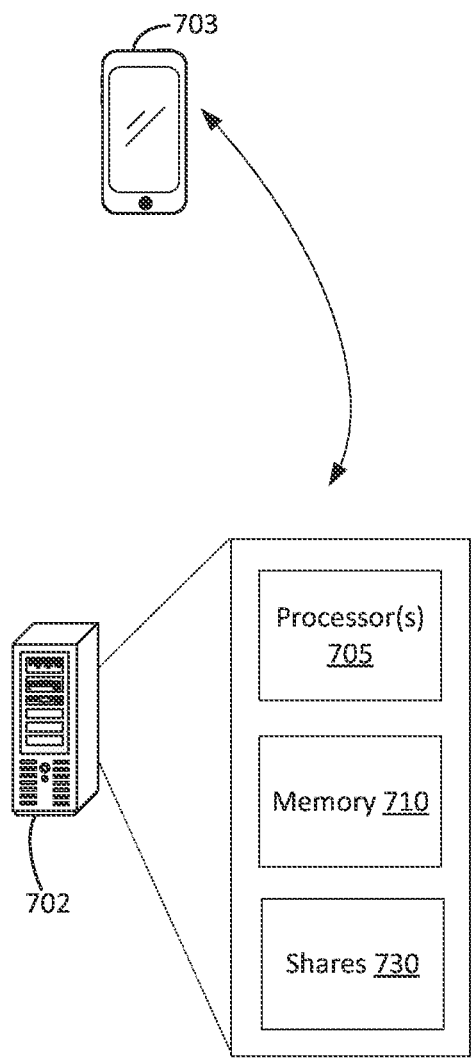
FIG. 7 illustrates an example of a device for providing a dynamic waterfall chart.

FIG. 7 illustrates an example of a device for providing a dynamic waterfall chart and automation a fund investment. In FIG. 7, a user using a computing device 703 (e.g., mobile phone, tablet, desktop computer, laptop computer, smart watch, etc.) can communicate with server 702 implementing the techniques disclosed herein. For example, server 702 includes a processor 705 and memory 710 as well as other types of hardware such as non-volatile memory, an interface device, etc. to implement shares logic 730 providing the techniques disclosed herein. Various common components (e.g., cache memory) are omitted for illustrative simplicity. The assistant device is intended to illustrate a hardware device on which any of the components described in the example of FIGS. 1-6 (and any other components described in this specification) can be implemented. The components of the assistant device can be coupled together via a bus or through some other known or convenient device.

The processor 705 may be, for example, a microprocessor circuit such as an Intel Pentium microprocessor or Motorola power PC microprocessor. One of skill in the relevant art will recognize that the terms "machine-readable (storage) medium" or "computer-readable (storage) medium" include any type of device that is accessible by the processor. Processor 705 can also be circuitry such as an application specific integrated circuits (ASICs), complex programmable logic devices (CPLDs), field programmable gate arrays (FPGAs), structured ASICs, etc.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk; a magnetic-optical disk; an optical disk; a read-only memory (ROM) such as a CD-ROM, EPROM, or EEPROM; a magnetic or optical card; or another form of storage for large amounts of data. Some of this data is often written, by a direct memory access process, into memory during the execution of software in the computer. The non-volatile storage can be local, remote or distributed. The non-volatile memory is optional because systems can be created with all applicable data available in memory. A typical computer system will usually include at least a processor, memory, and a device (e.g., a bus) coupling the memory to the processor.

The software can be stored in the non-volatile memory and/or the drive unit. Indeed, storing an entire large program in memory may not even be possible. Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program is can be stored at any known or convenient location (from non-volatile storage to hardware registers).

The bus also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as "processing" or "computing" or "calculating" or "determining" or "displaying" or "generating" or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A computer-readable storage medium, excluding transitory signals and carrying instructions, which, when executed by at least one data processor of a system, cause the system to:
   generate a graphical chart representing a price per share relative to a range of values for different types of shares of an enterprise;
   determine a first value for the enterprise based on a first position of an indicator on the graphical chart,
      wherein the first position is determined based on user input;
   determine a first set of values for the different types of shares based on the first value;
   cause display of a graphic overlay including content indicative of the first set of values for the different types of shares,
      wherein the content of the graphic overlay is based on the first position of the indicator;
   determine a second value for the enterprise based on a second position of the indicator on the graphical chart,
      wherein the second position is different from the first position; and
   dynamically update the content of the graphic overlay based on the second position of the indicator on the graphical chart,
      wherein the updated content is indicative of a second set of values for the different types of shares.

2. The computer-readable storage medium of claim 1, wherein the different types of shares include shares issued during different series rounds of venture capital financing.

3. The computer-readable storage medium of claim 1, wherein the first set of values are related to shares issued during a series round of venture capital financing and related to common shares.

4. The computer-readable storage medium of claim 1, wherein the graphical chart has a first axis indicating a range of enterprise values and a second axis indicating the value per share.

5. The computer-readable storage medium of claim 1, wherein the range of values for the different types of shares of the enterprise corresponds to a range of equity values for the different types of shares of the enterprise.

6. The computer-readable storage medium of claim 1, wherein determining the first value or the second value includes causing the system to:
   determine the first or second position of the indicator along a horizontal axis of the graphical chart representing the range of values.

7. The computer-readable storage medium of claim 1, wherein any position of the indicator on a first axis relative to a position on the graphical chart represents only one value for the enterprise.

8. The computer-readable storage medium of claim 1, wherein the range of values is based on information associated with recorded venture capital transactions.

9. A method comprising:
   causing display of a graphical chart representing a price per share relative to a range of values for different types of shares of an enterprise;
   dynamically determining a set of values for the different types of shares based on a position of an indicator on the graphical chart;
   causing display of a graphic overlay including content indicative of the set of values for the different types of shares,
      wherein the position is movable based on user input, and wherein the content of the graphic overlay is determined based on the position of the indicator; and
dynamically updating the content of the graphic overlay based on a new position of the indicator on the graphical chart,
wherein the updated content is indicative of a new set of values for the different types of shares.

10. The method of claim 9 further comprising:
generating an initial public offering (IPO) graphical chart indicative of estimate values for a common stock of the enterprise across the range of values,
wherein the estimate values are based on preferred shares being converted to the common stock.

11. The method of claim 10 further comprising:
enabling a user to toggle between the graphical chart representing the price per share and the IPO graphical chart indicative of estimate values for the common stock of the enterprise.

12. The method of claim 9, wherein the graphical chart is based on data indicating a funding history and a summary cap table for the enterprise, the method further comprising:
causing display of the funding history and summary cap table for the enterprise on a user interface including display of the graphical chart.

13. The method of claim 9, wherein the graphical chart has a first axis indicating a range of equity values and a second axis indicating the value per share.

14. The method of claim 9, wherein the graphical chart has a first axis indicating a range of enterprise values and a second axis indicating the value per share.

15. A system comprising:
one or more processors; and
a memory storing instructions that, when executed by the one or more processors, cause the system to:
cause display of a graphical chart indicating a price per share relative to a range of values for different types of shares of an enterprise;
determine a first set of values for the different types of shares based on a first position of an indicator on the graphical chart;
cause display of a graphic overlay including content indicative of the first set of values for the different types of shares,
wherein the content of the graphic overlay is based on the first position of the indicator;
determine a second position of the indicator on the graphical chart, wherein the second position is different from the first position; and
dynamically update the content of the graphic overlay based on the second position of the indicator on the graphical chart,
wherein the updated content is indicative of a second set of values for the different types of shares.

16. The system of claim 15, wherein the different types of shares include shares issued during different series rounds of venture capital financing.

17. The system of claim 15, wherein the range of values for the different types of shares of the enterprise corresponds to a range of enterprise values for the different types of shares of the enterprise.

18. The system of claim 15, wherein the range of values for the different types of shares of the enterprise corresponds to a range of equity values for the different types of shares of the enterprise.

19. The system of claim 15, wherein the indicator is movable to different positions on the graphical chart based on user input.

20. The system of claim 15, wherein the graphical chart is associated with a first axis and a second axis, and wherein any of multiple positions of the indicator in the first axis corresponds to only one value on the second axis.

* * * * *